April 30, 1968  A. WINKLER ET AL  3,380,362

CAMERA HOUSING

Filed July 22, 1965

INVENTOR.
ALFRED WINKLER
HEINZ ERNST
DIETER ENGELSMANN

Michael J. Striker

United States Patent Office

3,380,362
Patented Apr. 30, 1968

3,380,362
CAMERA HOUSING
Alfred Winkler and Heinz Ernst, Munich, and Dieter Engelsmann, Unterhaching, near Munich, Germany, assignors to Agfa-Gevaert Aktiengesellschaft, Leverkusen, Germany
Filed July 22, 1965, Ser. No. 474,078
Claims priority, application Germany, July 24, 1964, A 46,671
15 Claims. (Cl. 95—31)

ABSTRACT OF THE DISCLOSURE

The housing of a camera has a chamber for a film cartridge, and one wall of the chamber guides a spring-biased control member which is slidable in response to insertion of a properly oriented cartridge but is tilted when the user attempts to insert an improperly oriented cartridge. When tilted, the control member is automatically locked against sliding movement.

---

Figure 1:
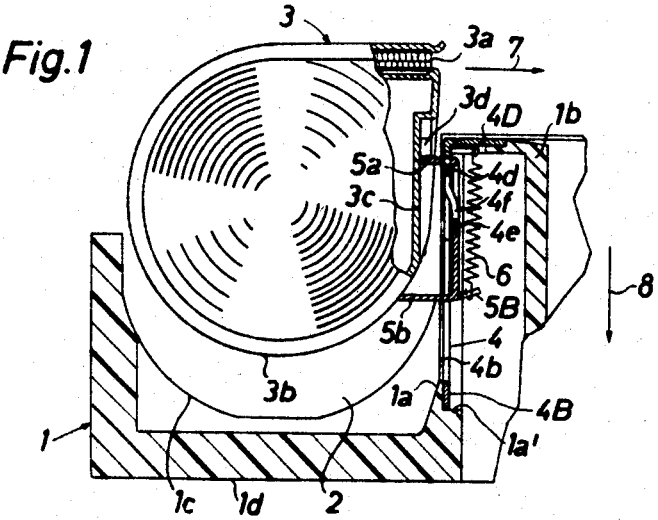

The present invention relates to photographic cameras, and more particularly to improvements in housing for photographic cameras. Still more particularly, the invention relates to a novel arrangement or assembly which insures proper insertion into, and also facilitates removal of a film magazine or cartridge from, the housing of a still camera or another photographic camera.

Proper insertion of a film supply or film take-up cartridge or magazine into the housing is an essential prerequisite for obtaining satisfactory exposures, especially in certain recent types of still cameras wherein the leading end of the film is automatically introduced into and secured to the take-up cartridge. Such still cameras are becoming increasingly popular because the user need not spend time to attach the leading end of the film to the spool of a take-up cartridge and because the camera can be used by persons having little experience, little patience or little ability to properly insert and attach a fresh film. In order to insure that the leading end of the film will be automatically introduced into the mouth of and is automatically attached to the spring clip or another suitable retaining device in a take-up cartridge, the mouth of the cartridge must be held in a predetermined position with reference to the film path so as to make sure that, when the film is advanced by the customary transporting lever or wheel, its leading end will automatically enter into and will advance through the mouth of the take-up cartridge. If the cartridge is inserted in the wrong way, its mouth can be located rather close to the film path but is still not in requisite position so that the leading end of the film will fail to enter the take-up cartridge. This will result in waste of film and might occur exactly at a time when the user is about to make an exposure of a subject or scene which is unique and cannot be repeated. Still further, and even if the leading end of the film enters the mouth of an improperly positioned take-up cartridge, such improper positioning might cause curling of that film frame which is located directly behind the objective so that the exposures will be inferior or totally useless.

Accordingly, it is an important object of the present invention to provide a camera housing which is constructed and assembled in such a way that it invariably prevents improper insertion of a film cartridge or magazine.

Another object of the invention is to provide a camera housing of the just outlined characteristics which is constructed with a view to immediately indicate to the user that he or she is attempting to insert a magazine or cartridge in a wrong way.

A further object of the invention is to provide a camera housing which will automatically eject a properly inserted film cartridge or magazine in response to a small displacement of the cartridge with reference to the housing.

An additional object of our invention is to provide a novel assembly which can be incorporated in or secured to the housing of a still camera to control the insertion of and to guide a properly oriented cartridge or magazine to an optimum position with reference to the remaining parts of the camera.

Still another object of the invention is to provide an assembly of the just outlined characteristics which is useful not only in connection with film supply cartridges but also with take-up cartridges, which can be installed in many presently known cameras, and which is of very simple, inexpensive and compact design so that its mounting in a housing adds little to the cost and bulkiness of the camera.

A concomitant object of the invention is to provide an assembly of the above outlined type which can be used to guide and to otherwise control the position, insertion and/or removal of conventional film cartridges or magazines.

Briefly stated, our present invention resides in the provision of a photographic camera comprising a housing which defines a film chamber arranged to accommodate a film cartridge or magazine, and means provided on the housing for preventing full insertion of the cartridge into the film chamber excepting in an optimum position with reference to the housing.

In accordance with a more specific feature of our invention, the housing comprises a guide wall which is adjacent to the film chamber, a control member which may assume the form of a panel or channel slidably and tiltably mounted on the guide wall and having a flange or otherwise shaped extension projecting into the film chamber, resilient means coupling the control member to the housing and arranged to bias the control member to a starting position in which the extension is located in the path of a cartridge which is about to be inserted into the film chamber whereby a properly oriented cartridge effects sliding movement and an improperly oriented cartridge effects tilting movement of the control member, and stop means provided on the guide wall and extending into the pathway of the control member to hold the latter against sliding movement when the control member has been tilted by engagement of its extension with an improperly oriented cartridge. The stop means of the guide wall is bypassed by the control member when the latter is caused to slide in response to engagement and resulting displacement of its extension by a properly oriented cartridge whereby such cartridge may be fully inserted into the film chamber.

In speaking of properly and improperly oriented cartridges, we are referring to the spatial position of a cartridge with reference to the housing during insertion into the film chamber. As a rule, even an unskilled user is normally capable of properly locating the ends of the cartridge with reference to the ends of the film chamber, but such an unskilled or inexperienced user is much less likely to invariably hold the cartridge in requisite angular position with reference to the housing at the time the cartridge is being pushed into the film chamber.

Figure 2:
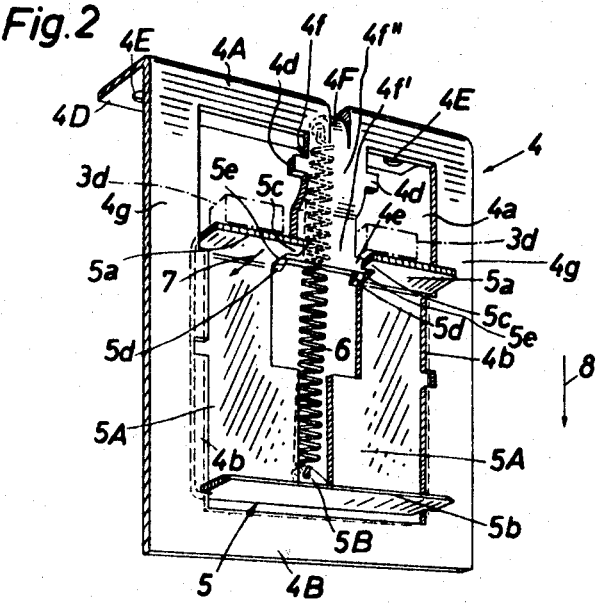

The novel features which are considered as characteristic of the invention are set forth in particular in the appended claims. The improved camera housing itself, however, both as to its construction and the mode of assembling the same, together with additional features and advantages thereof, will be best understood upon perusal of the following detailed description of a specific embodiment with reference to the accompanying drawings, in which:

FIG. 1 is a fragmentary horizontal section through a still camera whose housing is constructed and assembled in accordance with our invention; and FIG. 2 is an enlarged perspective view of certain details of the structure shown in FIG. 1.

Referring to FIG. 1, there is shown a housing 1 forming part of a still camera wherein a length of roll film is being paid out by a supply cartridge or magazine and is collected by a take-up magazine or cartridge 3. The housing 1 defines a film chamber 2 which can accommodate the cartridge 3, and this chamber 2 is adjacent to a film platform 1b along which the film is guided on its way toward and through the sealed mouth 3a of the cartridge. A side wall 1a of the housing 1 is adjacent to and extends forwardly from the film platform 1b. The housing 1 further comprises locating ribs 1c which are provided in the innermost (foremost) zone of the film chamber 2 and which straddle the mantle 3b of a properly inserted cartridge. The latter comprises a flat guide portion 3c which forms part of the mantle 3b and extends forwardly from the mouth 3a when the cartridge 3 is properly inserted into the film chamber 2. Two aligned motion transmitting projecting portions 3d of the cartridge 3 extend beyond the flat guide portion 3c and are adjacent to the mouth 3a. The purpose of the projecting portions 3d is to automatically adjust the exposure meter in dependency on the sensitivity of film which is being used in the camera. The position of the projecting portions 3d with reference to the remainder of the mantle 3b is indicative of a given film sensitivity. The manner in which such projecting portions 3d may adjust the exposure meter is disclosed, for example, in the copending application Ser. No. 440,171, of Dieter Engelmann et al., filed Mar. 16, 1965. It is clear that the projections 3d may be replaced by a single projection.

The camera of FIG. 1 is of the type wherein the leading end of the film is automatically advanced into and attached to the take-up cartridge 3. Therefore, it is of utmost importance to insure that the cartridge 3 be properly inserted into the film chamber 2 because any, even slight, misalignment of the mouth 3a with reference to the path of the film along the rear surface of the platform 1b might result in damage to the film, in failure of the leading end to enter the mouth 3a, in improper attachment of the leading end to the cartridge 3, or in complete by-passing of the mouth 3a by the leading end of the film. As a rule, the mouth 3a of a properly inserted cartridge 3 should be immediately adjacent to and its longitudinal extension should be parallel with the adjoining edge of the film platform 1b. The purpose of our present invention is to insure that the cartridge 3 can be fully inserted only in such a way that the mouth 3a is properly located in the path of and may permit entry of the film in response to actuation of the film transporting lever or wheel. To this end, the housing 1 comprises a guide wall 4 which is shown as constituting a separate element but which can be made integral with the side wall 1a. The guide wall 4 resembles a rectangular frame having a front section or strip 4B which is adjacent to the front wall 1d of the housing 1 and an L-shaped rear section 4A whose flange 4D is recessed into the rear surface of the film platform 1b. Two lateral sections 4g of the guide wall 4 extend between the ends of the sections 4A, 4B, and enclose therewith a rectangular space 4a. The inner edges 4b of the lateral sections 4g constitute two elongated parallel guide rails or ways for a slidably and tiltably mounted control element here shown as a panel 5. The side wall 1a of the housing 1 is provided with a relatively large cutout 1a' which accommodates the guide wall 4 in a manner as shown in FIG. 1, and the flange 4D is provided with apertures 4E (see FIG. 2) for suitable screws, rivets or other fasteners which secure the guide wall to the housing 1. This guide wall 4, and also the control member or panel 5, may consist of rigid metallic or plastic sheet stock. Instead of resorting to fasteners, the guide wall 4 may be glued to the side wall 1a and platform 1b. Furthermore, and as mentioned thereinabove, the guide wall 4 may constitute an integral part of the housing 1.

When the guide wall 4 is properly installed in the housing 1, the rails 4b are parallel with the optical axis. This guide wall further comprises a tongue or carrier 4f which is located substantially midway between the lateral sections 4g and extends from the rear section 4A forwardly toward but short of the front section 4B. The median portion of the tongue 4f is bent in the direction indicated by an arrow 7 so that the plane of the foremost portion 4f' of this tongue is offset with reference to but is parallel with the common plane of the sections 4A, 4B and 4g. This foremost portion 4f of the tongue 4f is located in front of the flange 4D, i.e., it is more distant from the film chamber 2 than the main part of the guide wall 4. The rear portion 4f" of the tongue 4f is provided with two laterally extending projections or stops 4d, and similar laterally extending projections or retaining elements 4e are provided on the foremost portion 4f' of the tongue.

In the illustrated embodiment, the control member or panel 5 resembles a U-shaped channel and is coupled to the guide wall 4 in such a way that it can slide longitudinally of the guide rails 4b but is also tiltable with reference to the common plane of the sections 4A, 4B, 4g. The means for coupling the panel 5 to the guide wall 4 comprises a helical spring 6 one end of which is anchored in a lug or ear 5B and the other end of which is anchored in a lug or ear 4F, the latter being formed by a stamped-out median portion of the flange 4D. The spring 6 tends to shift the panel 5 upwardly, as viewed in FIG. 2, namely, toward the flange 4D and away from the front section 4B. FIG. 1 shows the panel 5 in its starting position. The two-piece base or web 5A of the panel 5 is located in the cutout 1a' of the side wall 1a and the flange-like extensions 5a, 5b of the panel extend through the space 4a in the guide wall 4 and into the film chamber 2.

The rear extensions 5a of the panel 5 are disposed in a common plane which is normal to the common plane of the rails 4b and their adjoining edge portions are provided with pairs of projections 5c, 5d separated from each other by open slots 5e. The projections 5c, 5d of each rear extension 5a project toward the tongue 4f of the guide wall 4.

When the film chamber 2 is empty, the spring 6 maintains the panel 5 in the aforementioned starting position in which the slots 5e of the rear extensions 5a are located between the stops 4d of the tongue 4f and the rear section 4A of the guide wall 4. The spring 6 is then contracted and stores little energy. If the user decides to insert the cartridge 3, and if the user is clumsy or ignorant and attempts to insert the cartridge in such a way that a substantially cylindrical part of the mantle 3b engages the rear extensions 5a of the panel 5 (which latter is then fully retracted as shown in FIG. 1), the cylindrical portion of the mantle 3b will tilt the extensions 5a in the direction indicated in FIG. 1 by the arrow 7 and, at the same time, the panel 5 will be urged to slide in the direction indicated by an arrow 8, i.e., in a direction which is substantially parallel with the optical axis. Due to their displacement in the direction indicated by the arrow 7 and against the tips of the spring 6, the projections 5c of the rear extensions 5a move against the stops 4d of the tongue 4f and prevent sliding movement of the panel 5 in the direction indicated by the arrow 8. Thus, the user immediately notes that the cartridge 3 cannot be pushed all the way into the film chamber 2 and knows that he or she must attempt a different approach.

If the cartridge 3 is properly oriented prior to insertion into the film chamber 2, i.e., if the flat guide portion 3c of its mantle 3b is adjacent to the rear extensions 5a, these extensions will be engaged by the motion transmitting portions 5d of the mantle 3b and will cause the panel 5 to slide along the rails 4b (arrow 8) whereby the projections 5c and 5d bypass the stops 4d of the tongue 4f because the stops 4d are then aligned with the slots 5e. Such movement of the panel 5 is possible when the mouth 3a of the cartridge 3 is properly oriented with reference to the platform 1b of the housing 1.

The retaining elements 4e of the tongue 4f are offset with reference to the stops 4d because the foremost portion 4f' of the tongue is offset with reference to the rear portion 4f'' thereof. Consequently, as the panel 5 continues to move forwardly (i.e., toward the position shown in FIG. 2), the spring 6 bulges in the direction indicated by the arrow 7 and causes the projections 5d to snap behind the retaining elements 4e as soon as the cartridge 3 is properly received in the film chamber 2, namely, as soon as the mouth 3a moves into full registry with the path of the film along the rear surface of the platform 1b and as soon as the cylindrical portion of the mantle 3b comes into actual abutment with the locating ribs 1c. In other words, when the cartridge 3 is properly and fully inserted into the film chamber 2, the panel 5 is automatically locked to the guide wall 4 because the projections 5d snap behind the retaining elements 4e and prevent contraction of the spring 6. Such snapping of the projections 5d behind the retaining elements 4e of the tongue 4f is caused by the spring 6 and is due to the fact that the portions 4f', 4f'' of the tongue 4f are not disposed in a common plane. The front extension or flange 5b serves to abut against the cylindrical portion of the mantle 3b during insertion of a properly oriented cartridge 3. In other words, the user will feel that the cartridge is properly held if he notes that the flat portion 3c is adjacent to the rear extensions 5a, that these rear extension are engaged by the motion transmitting portion 3d and that the mantle 3b abuts against the front extension 5b.

In order to remove a film-containing cartridge 3 from the chamber 2, the user will tilt the cartridge slightly in a counterclockwise direction, as viewed in FIG. 1, whereby the cylindrical portion of the mantle 3b engages and depresses the rear extensions 5a (arrow 7) and disengages the projections 5d from the retaining elements 4e of the tongue 4f. The spring 6 is now free to contract and shifts the panel 5 upwardly, as viewed in FIG. 2, to automatically eject the cartridge from the chamber 2. Such ejection will take place when the retaining elements 4e are aligned with the slots 5e between the projections 5c, 5d of the rear extensions 5a. The contraction of the spring 6 will cause the panel 5 to slide in a direction counter to that indicated by the arrow 8 and back to starting position. Of course, the spring 6 need not fully eject the cartridge, as long as the latter is lifted sufficiently to be readily engaged by two fingers for complete withdrawal from the housing 1.

It will be seen that the assembly including the guide wall 4 and the panel 5 performs a series of functions including preventing improper insertion of a cartridge, guiding a properly oriented cartridge to optimum position with reference to the platform 1b, and partially ejecting a cartridge from the film chamber.

If the user wishes to insert a cartridge 3 in such a way that the mouth 3a faces away from the platform 1b, the cylindrical portion of the mantle 3b invariably prevents sliding movement of the panel 5 in the direction of the arrow 8 so that the panel is blocked and prevents full insertion of the cartridge. The user must withdraw the cartridge and must change its orientation in such a way that the rear extensions 5a will abut against the flat guide portion 3c and that the extensions 5a are engaged by the motion transmitting portions 3d. The cartridge is then properly oriented with reference to the housing 1 and may be fully inserted into the film chamber 2 in a manner as described above. Simple turning of an improperly inserted cartridge will not help; it is necessary to bodily remove such cartridge and to reinsert it in a properly oriented position.

The housing 1 further comprises a rear wall (not shown) which must be moved to an open position prior to insertion of a cartridge as well as prior to removal of a cartridge. The rear wall may be fully detachable from or is hingedly connected with the remainder of the housing 1. When returned to closed position, the rear wall seals the film chamber 2 and also the other film chamber (which contains the supply cartridge) against penetration of light rays.

It is clear that the improved camera housing is susceptible of many modifications without departing from the spirit of our invention. For example, the rear extensions 5a of the panel 5 could be engaged by parts other than the motion transmitting portions 3d of the cartridge 3, and the flat portion 3c of the mantle 3b could be replaced by a cam having a cam face which insures that the rear extensions 5a will bypass the stops 4d when the cartridge is properly oriented prior to actual insertion into the film chamber 2. Furthermore, and as mentioned hereinbefore, the guide wall 4 may be made as an integral part of the housing 1 and the stops 4d and retaining elements 4e then extend from the side wall 1a. In such cameras, the wall 1a of the housing 1 is provided with suitable guide rails replacing the rails 4b and with a carrier replacing the tongue 4f. The guide rails may be integral with or are detachably secured to the side wall 1a.

Finally, it is equally obvious that the assembly shown in FIG. 2 can be incorporated in another part of the housing 1 so as to control the insertion of a film supply cartridge. The stops 4d and retaining elements 4e are then preferably provided on the lateral sections 4g so as not to interfere with the operation of the mechanism which is actuated by the motion transmitting portions 3d of the supply cartridge and serves to adjust the exposure meter in dependency on the sensitivity of film in the supply cartridge.

The take-up cartridge 3 need not be provided with the motion transmitting portions 3d if such portions form part of the other (supply) cartridge because it is normally the supply cartridge which will adjust the exposure meter in dependency on the sensitivity of film therein. However, and since the two cartridges are preferably of identical shape, we show that the cartridge 3 is provided with such portions 3d. In the absence of the portions 3d, the panel 5 can be engaged by another suitable projection or shoulder on the mantle 3b.

Without further analysis, the foregoing will so fully reveal the gist of the present invention that others can, by applying current knowledge readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be protected by Letters Patent is:

1. In a photographic camera, a housing defining a film chamber arranged to accommodate a removable film cartridge, said housing comprising a guide wall adjacent to said chamber; a control member slidably and tiltably mounted on said guide wall and having an extension projecting into said chamber; resilient means coupling said control member to said housing and arranged to bias the control member to a starting position in which said extension is located in the path of a cartridge which is about to be inserted into said chamber whereby a properly oriented cartridge effects sliding movement and an improperly oriented cartridge effects tilting movement of said control member; and stop means provided on said guide wall and extending into the pathway of said control member to prevent said sliding movement when the control member is tilted by engagement of said extension with an improperly oriented cartridge, said stop means being bypassed by said control member when the latter is caused to slide in response to engagement and resulting displacement of said extension by a properly oriented cartridge.

2. In a photographic camera, a housing defining a film chamber arranged to accommodate a removable film cartridge, said housing comprising a guide wall adjacent to said chamber; a control member slidably and tiltably mounted on said guide wall and having a flange means projecting into said chamber; resilient means coupling said control member to said housing and arranged to bias said control member to a starting position in which said flange means extends into the path of the mantle forming part of a cartridge which is about to be inserted into said chamber whereby the mantle of a properly oriented cartridge effects sliding movement and the mantle of an improperly oriented cartridge effects tilting movement of said control member; and stop means provided on said guide wall and extending into the pathway of said control member to prevent said sliding movement when the control member is tilted by engagement of said flange means with the mantle of an improperly oriented cartridge.

3. In a photographic camera, a housing defining a film chamber arranged to accommodate a removable film cartridge of the type having a mantle provided with a motion transmitting portion, said housing comprising a guide wall adjacent to said chamber; a control member slidably and tiltably mounted on said guide wall and having an extension projecting into said chamber; resilient means coupling said control member with said housing and arranged to bias the control member to a starting position in which said extension is located in the path of a cartridge which is about to be inserted into said chamber whereby the mantle of an improperly oriented cartridge effects tilting movement and the motion transmitting portion of a properly oriented cartridge effects sliding movement of said control member; and stop means provided on said guide wall and extending into the pathway of said control member to prevent said sliding movement when the control member is tilted by engagement of said extension with the mantle of an improperly oriented cartridge, said stop means being bypassed by said control member when the latter is caused to slide in response to engagement and resulting displacement of said extension by the motion transmitting portion of a properly oriented cartridge whereby such properly oriented cartridge may be fully inserted into said chamber.

4. In a photographic camera, a housing defining a film chamber arranged to accommodate a removable film cartridge, said housing comprising a guide wall adjacent to said chamber; a control member slidably and tiltably mounted on said guide wall and having an extension projecting into said chamber, said extension having a pair of projections and a slot disposed between said projections; resilient means coupling said control member to said housing and arranged to bias said control member to a starting position in which said extension is located in the path of a cartridge which is about to be inserted into said chamber whereby a properly oriented cartridge effects sliding movement and an improperly oriented cartridge effects tilting movement of said control member; stop means provided on said guide wall and extending into the pathway of one of said projections to prevent said sliding movement when the control member is tilted by engagement of said extension with an improperly oriented cartridge, said stop means being aligned with said slot when the control member is caused to slide in response to engagement of its extension by a properly oriented cartridge whereby such cartridge can be fully inserted into said chamber; and retaining means provided on said guide wall for engaging the other of said projections on completion of said sliding movement to hold the control member against the bias of said resilient means.

5. A structure as set forth in claim 4, wherein said projections are located in a plane which is inclined with reference to the direction of sliding movement of said control member and wherein said stop means is located in a plane which is parallel to the plane of said retaining means.

6. A structure as set forth in claim 5, wherein said guide wall comprises a carrier which supports said stop means and said retaining means.

7. In a photographic camera, a housing defining a film chamber arranged to accommodate a removable film cartridge, said housing comprising a guide wall adjacent to said chamber; a control member slidably and tiltably mounted on said guide wall and having an extension projecting into said chamber, said extension having a pair of spaced projections; resilient means coupling said control member to said housing and arranged to bias said control member to a starting position in which said extension is located in the path of a cartridge which is about to be inserted into said chamber whereby a properly oriented cartridge effects sliding movement and an improperly oriented cartridge effects tilting movement of said control member; stop means provided on said guide wall and extending into the pathway of one of said projections to prevent said sliding movement when the control member is tilted by engagement of said extension with an improperly oriented cartridge, said stop means being bypassed by said projections when the control member is caused to slide in response to engagement of its extension by a properly oriented cartridge whereby such cartridge can be fully inserted into said chamber; and retaining means provided on said guide wall for engaging the other of said projections on completion of said sliding movement to hold the control member against the bias of said resilient means.

8. In a photographic camera, a housing defining a film chamber arranged to accommodate a removable film cartridge, said housing comprising a side wall adjacent to said chamber; a guide wall secured to said side wall; a control member slidably and tiltably mounted on said guide wall and having an extension projecting into said chamber, said extension having a pair of spaced projections; resilient means coupling said control member to said housing and arranged to bias said control member to a starting position in which said extension is located in the path of a cartridge which is about to be inserted into said chamber whereby a properly oriented cartridge effects sliding movement and an improperly oriented cartridge effects tilting movement of said control member; stop means provided on said guide wall and extending into the pathway of one of said projections to prevent said sliding movement when the control member is tilted by engagement of said extension with an improperly oriented cartridge, said stop means being bypassed by said projections when the control member is caused to slide in response to engagement of its extension by a properly oriented cartridge whereby such cartridge can be fully inserted into said chamber; and retaining means provided on said guide wall for engaging the other of said projections on completion of said sliding movement to hold the control member against the bias of said resilient means.

9. In a photographic camera, a housing defining a film chamber arranged to accommodate a removable film cartridge, said housing comprising a side wall adjacent to said chamber; a guide wall mounted on said side wall; a control member slidably and tiltably mounted on said guide wall and having an extension projecting into said chamber; resilient means coupling said control member to said housing and arranged to bias the control member to a starting position in which said extension is located in the path of a cartridge which is about to be inserted into said chamber whereby a properly oriented cartridge effects sliding movement and an improperly oriented cartridge effects tilting movement of said control member; and stop means provided on said guide wall and extending into the pathway of said control member to prevent said sliding movement when the control member is tilted by engagement of said extension with an improperly oriented cartridge, said stop means being bypassed by said control member when the latter is caused to slide in response to engagement and resulting displacement of said extension by a properly oriented cartridge.

10. In a photographic camera, a housing defining a film chamber arranged to accommodate a removable film cartridge, said housing comprising a guide wall adjacent to said chamber; a control member slidably and tiltably mounted on said guide wall and having a first and a second extension each projecting into said chamber; resilient means coupling said control member to said housing and arranged to bias the control member to a starting position in which said first extension is located in the path of a cartridge which is about to be inserted into said chamber whereby a properly oriented cartridge effects sliding movement and an improperly oriented cartridge effects tilting movement of said control member; and stop means provided on said guide wall and extending into the pathway of said control member to prevent said sliding movement when the control member is tilted by engagement of said first extension with an improperly oriented cartridge, said stop means being bypassed by said control member when the latter is caused to slide in response to engagement and resulting displacement of said first extension by a properly oriented cartridge, said second extension being engaged by the cartridge during insertion of the latter into said chamber to insure continued proper orientation during such insertion.

11. In a photographic camera, a housing defining a film chamber arranged to accommodate a removable film cartridge, said housing comprising a guide wall adjacent to said chamber; a control member slidably and tiltably mounted on said guide wall and having an extension projecting into said chamber; resilient means coupling said control member to said housing and arranged to bias the control member to a starting position in which said extension is located in the path of a cartridge which is about to be inserted into said chamber whereby a properly oriented cartridge effects sliding movement and an improperly oriented cartridge effects tilting movement of said control member; and stop means provided on said guide wall and extending into the pathway of said control member to prevent said sliding movement when the control member is tilted by engagement of said extension with an improperly oriented cartridge, said stop means being bypassed by said control member when the latter is caused to slide in response to engagement and resulting displacement of said extension by a properly oriented cartridge and said resilient means being strong enough to eject a properly inserted cartridge from said chamber through the intermediary of said control member when the latter is free to return to said starting position.

12. In a photographic camera, a housing defining a film chamber arranged to accommodate a removable film cartridge, said housing comprising a guide wall adjacent to said chamber; a control member slidably and tiltably mounted on said guide wall and having an extension projecting into said chamber, said extension having a pair of projections and a slot disposed between said projections; resilient means coupling said control member to said housing and arranged to bias said control member to a starting position in which said extension is located in the path of a cartridge which is about to be inserted into said chamber whereby a properly oriented cartridge effects sliding movement and an improperly oriented cartridge effects tilting movement of said control member; stop means provided on said guide wall and extending into the pathway of one of said projections to prevent said sliding movement when the control member is tilted by engagement of said extension with an improperly oriented cartridge, said stop means being aligned with said slot when the control member is caused to slide in response to engagement of its extension by a properly oriented cartridge whereby such cartridge can be fully inserted into said chamber; and retaining means provided on said guide wall for engaging the other of said projections on completion of said sliding movement to hold the control member against the bias of said resilient means, said control member being tiltable in response to turning of a fully inserted cartridge in said chamber to disengage said other projection from said retaining means so that said resilient means then returns said control member to starting position and said extension effects partial expulsion of the cartridge from said chamber.

13. In a photographic camera, a housing defining a film chamber arranged to accommodate a removable film cartridge of the type having a mantle provided with a motion transmitting portion whose position with reference to the remainder of the mantle is indicative of the sensitivity of film normally stored in the cartridge, said housing comprising a guide wall adjacent to said chamber; a control member slidably and tiltably mounted on said guide wall and having an extension projecting into said chamber; resilient means coupling said control member with said housing and arranged to bias the control member to a starting position in which said extension is located in the path of a cartridge which is about to be inserted into said chamber whereby the remainder of the mantle of an improperly oriented cartridge effects tilting movement and the motion transmitting portion of a properly oriented cartridge effects sliding movement of said control member; and stop means provided on said guide wall and extending into the pathway of said control member to prevent said sliding movement when the control member is tilted by engagement of said extension with the remainder of the mantle of an improperly oriented cartridge, said stop means being bypassed by said control member when the latter is caused to slide in response to engagement and resulting displacement of said extension by the motion transmitting portion of a properly oriented cartridge whereby such properly oriented cartridge may be fully inserted into said chamber.

14. For use in a camera, an assembly comprising a guide wall including elongated guide rail means and a stop; a control member slidable along said rail means and tiltable with reference to said wall, said control member comprising a projection; and resilient means coupling said control member with said wall and arranged to bias said control member to a starting position, said control member being slidable away from such starting position in the absence of tilting with reference to said wall whereas, when tilted, said control member moves said projection into registry with said stop and is prevented from leaving said starting position.

15. For use in a still camera, an assembly comprising a guide wall including a pair of coplanar parallel guide rails and a carrier located between said rails and provided with a pair of projections located in parallel planes and spaced from each other in the longitudinal direction of said rails; a control member slidable along said rails and tiltable with reference to said wall, said control member comprising a pair of projections located in a predetermined plane which is inclined with reference to the plane of said rails and having a slot between said last named projections; and resilient means coupling said wall with said control member and arranged to bias said control member to a starting position in which the projections of said wall are located at one side of said predetermined plane, said control member being slidable along said rails and away from said starting position when its projections are free to bypass the projections of said wall and one of its projections engaging a projection of said wall to prevent such sliding movement when the control member is tilted with reference to said wall.

References Cited

UNITED STATES PATENTS

| 1,481,673 | 1/1924 | Baille | 95—31 |
| 2,381,033 | 8/1945 | Bolsey | 95—31 |
| 3,025,777 | 3/1962 | Wilkenson | 95—31 |

FOREIGN PATENTS 456,783  7/1944  Belgium.

NORTON ANSHER, *Primary Examiner.*

R. A. SCHROEDER, *Assistant Examiner.*